United States Patent [19]

McGhie et al.

[11] Patent Number: 5,348,507
[45] Date of Patent: Sep. 20, 1994

[54] BICYCLE BUBBLE TOY

[75] Inventors: John R. McGhie, St. George, Utah; Kole D. Johnson, Winnemucca, Nev.

[73] Assignee: Dreams Come True Enterprises International, Inc., Midvale, Utah

[21] Appl. No.: 107,584

[22] Filed: Aug. 18, 1993

[51] Int. Cl.$^5$ ............................................. A63H 33/28
[52] U.S. Cl. .......................................... 446/16; 446/15
[58] Field of Search ..................... 446/15, 16, 18, 20, 446/21; 280/288.4, 727, 900

[56] References Cited

U.S. PATENT DOCUMENTS

| | | | |
|---|---|---|---|
| 2,412,732 | 12/1946 | Holman | 446/16 |
| 2,452,794 | 11/1948 | Saachy | 446/16 |
| 2,547,825 | 4/1951 | King | 446/16 |
| 2,862,320 | 12/1958 | Mayo | 446/16 |
| 3,008,263 | 11/1961 | Ellman | 446/15 |
| 3,100,947 | 8/1963 | Hellman | 446/16 |
| 3,246,418 | 4/1966 | Anderson et al. | 446/16 |
| 3,473,253 | 10/1969 | Jakubowski et al. | 446/20 |
| 3,708,909 | 1/1973 | Winston | 446/16 |
| 3,913,260 | 10/1975 | Corbett | 446/16 |
| 3,925,923 | 12/1975 | La Fata et al. | 446/18 |
| 4,044,496 | 8/1977 | Jernstrom | 446/16 |
| 4,045,049 | 8/1977 | Schultz | 446/15 |
| 4,062,143 | 12/1977 | Lerman | 446/16 |
| 4,423,565 | 1/1984 | Bart | 446/16 |
| 4,764,141 | 8/1988 | D'Andrade | 446/20 |

FOREIGN PATENT DOCUMENTS 0094532 11/1983 European Pat. Off. .............. 446/16

Primary Examiner—Robert A. Hafer
Assistant Examiner—Jeffrey D. Carlson
Attorney, Agent, or Firm—M. Reid Russell

[57] ABSTRACT

A toy for mounting onto a handle bar of a bicycle, tricycle or the like, that, when the bicycle is moved to pass an air flow therethrough creates a stream of soap bubbles. The toy includes a double clamp mount for fitting to the bicycle handle bar and whereto a mounting rod end for mounting the toy off-set from the side of a bicycle operator is maintained, with the opposite mounting rod end for mounting to a bubble generation assembly that includes a reservoir housing for containing a water and soap solution. The reservoir housing incorporates an upright standard whereto a propeller or rotor that has a plurality of spaced blades secured at equidistant intervals around a spindle is mounted to turn in the air stream in front of a slot that has been formed along a reservoir housing top edge. A bar is secured to extend from a trailing edge of each of the propeller or rotor blades that in turn, individually mount a bubble ring across an the end thereof. Each bubble ring travels as the propeller or rotor turns, into and through the reservoir interior that contains a water and soap solution, applying a soap film across the ring that, with continued propeller or rotor turning, travels into the air stream. The exposure of the soap film covered ring to the air stream produces a soap bubble or series of bubbles flowing from each bubble ring.

14 Claims, 3 Drawing Sheets

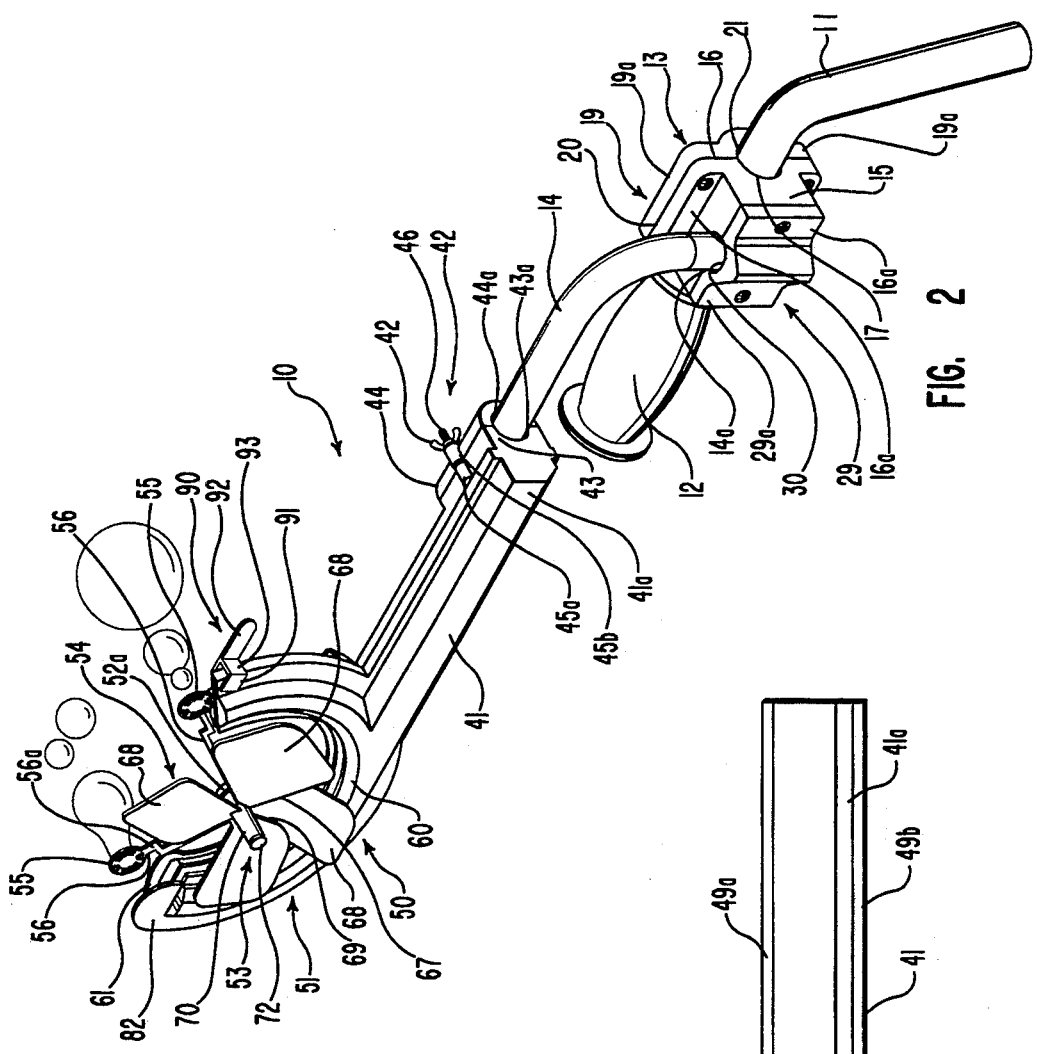
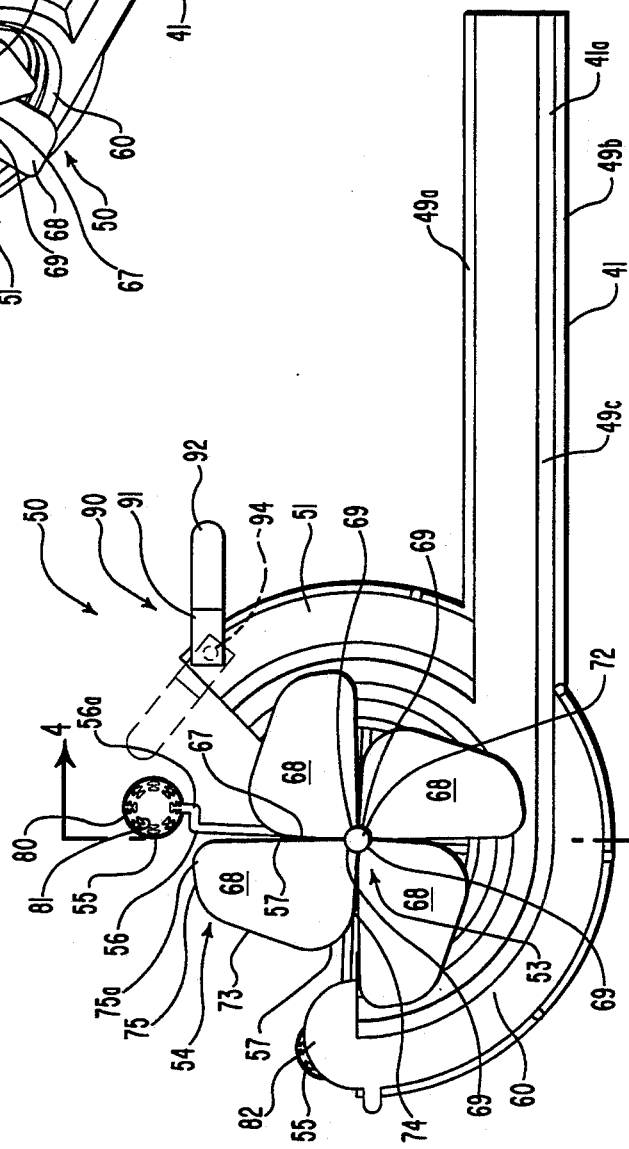
FIG. 2
FIG. 3

BICYCLE BUBBLE TOY

BACKGROUND OF THE INVENTION

1. Field of the Invention

This invention relates to toys and in particular to toys for generating soap bubbles when an air flow is directed therethrough.

2. Prior Art

Toys that include a ring or rings for immersion in a soap solution to receive a soap film across the ring to generate bubbles when that ring is moved through or receives an air flow or stream passed therethrough are clearly not new. Such have included sticks that mount a ring on the end for dipping into a jar containing a soap solution with an operator, holding that stick, moving the stick and ring through the air to generate a stream of bubbles out of that ring, to large rings and paddles with multiple holes or open rings formed therein for immersion in a pan of soap solution for movement through the air to generate both large bubbles and streams of soap bubbles.

As with toys for generating soap bubbles, toys that involve windmills are common. For example, a children's toy known as a pin wheel that includes a propeller or rotor portion that is pivotally mounted onto the end of a stick, is well known. The propeller or rotor portion of the device turns as the child swings the stick through the air. Such pin wheel and like propeller toys are common and some have included arrangements for mounting to handle bars of a bicycle tricycle, and the like. No toy within the knowledge of the inventor, however, has provided a combined structure of a wind driven propeller and bubble blower as a handle bar accessory for a bicycle, tricycle, hot wheels, or the like. Distinct from the invention, a bubble-making toy has been earlier produced, as shown in a patent to Schultz, U.S. Pat. No. 4,045,049, that involves a paddle wheel that is turned by an air flow from an electric motor driven fan and is for mounting to extend outwardly from the side of a bicycle head tube.

SUMMARY OF THE INVENTION

It is a principal object of the present invention in a bicycle bubble toy to provide a toy that is arranged for convenient mounting onto the handle bar of a bicycle, tricycle, hot wheels, or like vehicle, to extend beyond the vehicle operator into an air stream generated by moving the vehicle, as by peddling, the generated air stream for turning a propeller or rotor and generating a stream of soap bubbles.

Another object of the present invention is to provide a bicycle bubble toy that combines both a propeller or rotor for turning in an air stream and an arrangement for generating a stream of soap bubbles.

Another object of the present invention is to provide a bicycle bubble toy where propeller or rotor blades each includes an extension that mounts a bubble ring across an outer end thereof arranged for turning through a reservoir containing a soap and water mixture, providing a soap film that attaches across each ring that, when, the propeller or rotor is turned passes the bubble ring into the air stream, produces a series or string of bubbles.

Another object of the present invention is to provide a bicycle bubble toy where the reservoir pivotally mounts the propeller or rotor blades that each mount, on an outer end, a bubble ring that extends therefrom for turning through the reservoir and across the air stream, which reservoir is arranged to be conveniently filled with a soap and water solution and is formed to restrict sloshing of that solution therefrom as a bicycle or other vehicle mounting the invention is accelerated and decelerated.

Still another object of the present invention is to provide a bicycle bubble toy where the reservoir and pivotal mounted propeller or rotor are maintained off to the side of an operator with the propeller or rotor turned towards the operator, such that the air stream is directed into a propeller or rotor ring as it lifts out of the reservoir, maintaining the bubble stream away from the operator.

Still another object of the present invention is to provide a bicycle bubble toy that includes a mounting rod, one end of which is for mounting to the vehicle handle bar to extend outwardly therefrom, away from the operator's side, with the other mounting rod end for fitting to a mounting arm that extends from the reservoir.

Still another object of the present invention is to provide a bicycle bubble toy that includes a brake that can be manipulated by an operator for prohibiting turning of the propeller or rotor.

Still another object of the present invention is to provide a bicycle bubble toy that is convenient and easy to manufacture from a plastic material utilizing molding methods, and is accordingly inexpensive to produce and can therefore be competitively priced for sale as an inexpensive toy.

The above objects are achieved in accordance with the present invention that provides a new and unique bicycle bubble toy and an arrangement for mounting it onto the handle bar of a conventional bicycle, tricycle, hot wheels, or like vehicle, for generating a stream of soap bubbles by an air stream that is generated by the moving vehicle, the bubble stream to extend alongside the vehicle operator. The invention includes a first clamp type mount for attachment to the vehicle handle bar that, in turn, maintains, in a second clamp type mount, a mounting rod to extent outwardly therefrom across the plane of the handle bar and beyond the side of the operator. To which mounting rod, a reservoir arm is releasably connected that provides for positioning the reservoir off to the side of the operator such that a stream of soap bubbles therefrom will pass alongside of the operator.

The reservoir is formed from opposing front and rear sections joined around their outer perimeter and is for containing a liquid soap and water solution. The front and rear sections are arcuate segments that are somewhat less than one hundred eighty (180) degrees of arc and are individually concave outwardly. The joined sections form, essentially, an open half donut shaped interior area that is open along a slot in their inner perimeter to pass an end of a bar that mounts a bubble ring traveling therealong. A vertically upstanding standard is secured to a rear section such that an outer end thereof is positioned at approximately the center of the arc of the joined reservoir front and rear sections that provides a mounting point for pivotally spindle coupling a propeller or rotor thereto. The blades of which propeller or rotor are each bent outwardly, at a same blade angle away from the pivot mount, to be turned in an air flow. The trailing edge of each of the propeller or rotor blades includes a straight bar extending therefrom that passes into reservoir between the sides of the slot formed between the reservoir front and rear sections along their upper periphery. Each bar end includes a bubble ring mounted across the bar end, that is dragged through the reservoir as the propeller or rotor turns collecting a soap film thereacross when passed through the soap and water solution in the reservoir.

With the invention mounted to a moving bicycle, an air flow or stream turns the pivot mounted propeller or rotor. That turning moves each blade bar end mounting a bubble ring through the reservoir, exposing each solution coated bubble ring, in turn, to the air stream. The bubble rings, in turn, each produce from exposure to the air stream, a stream of soap bubbles that flow along side the vehicle operator. The bubble stream generation will continue as long as the air stream is present to turn the propeller or rotor and as long as there is a soap and water solution in the reservoir. To terminate bubble production, a brake is pivotally connected across the reservoir slot and is arranged to move a section thereof across one end of the slot, reservoir front and rear sections, to engage and block propeller or rotor turning. Further, a transparent housing wall is provides across an outer face of the reservoir rear section that communicates with the reservoir interior and includes spaced lines formed thereacross that are to give a visual indication of the reservoir fluid level, which transparent wall section includes a spout to receive a soap and water solution poured therethrough.

BRIEF DESCRIPTION OF THE DRAWINGS

A preferred embodiment of the bicycle bubble machine of the invention that represents the best mode as is presently contemplated for carrying out the invention is illustrated in the accompanying drawings, in which:

FIG. 2 is an assembled view of the invention of FIG. 1 that is shown mounted onto a right side of a bicycle, tricycle, or like vehicle handle bar, proximate to a hand grip, extending outwardly therefrom, and illustrating the handle bar as moving forward creating an air flow that is passed through the invention to generate streams of soap bubbles;

FIG. 3 is a front elevation view of a reservoir housing and mounting arm assembly of the invention of FIG. 1.

DETAILED DESCRIPTION

Figure 1:
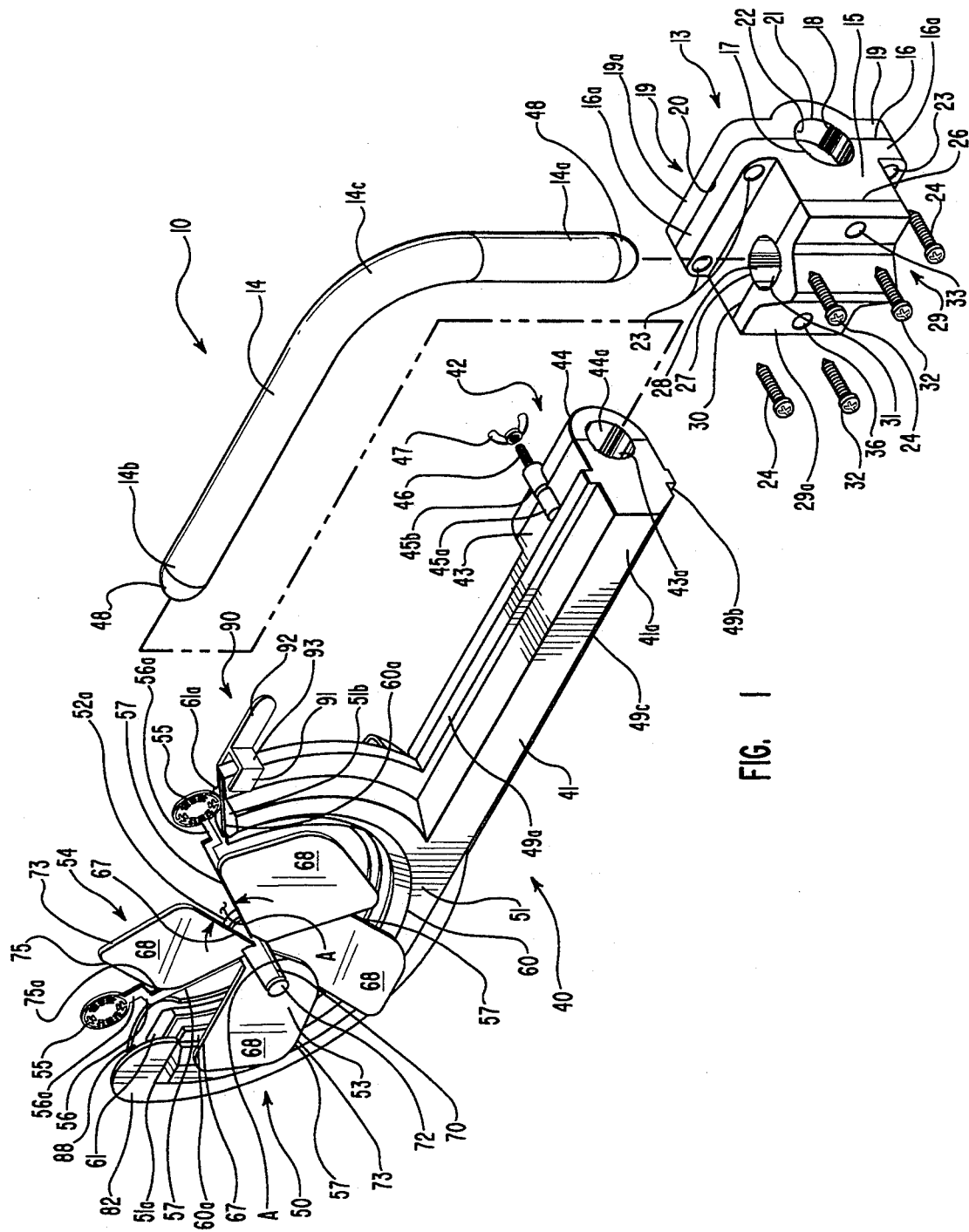
FIG. 1 is frontal perspective exploded view of the bicycle bubble machine of the invention shown as including three component assemblies.

FIG. 1 shows an exploded front perspective view of a bicycle bubble toy 10 of the invention, hereinafter referred to as bubble toy. In FIG. 2 the bubble toy 10 is shown assembled and mounted onto a handle bar 11 end, shown herein as a right end, adjacent to a hand grip 12. A double clamp 13 is provided for releasably attaching a mounting rod 14 end 14a to the handle bar 11 end. The double clamp 13, as shown best in FIG. 1, may be a solid rectangular section, or may be hollow and contain spaced ribs, is shown as including a rectangular body portion 15 that has a half arcuate slot 17 formed across a flat face 16 thereof. The half arcuate slot 17 is shown to include a series of longitudinal teeth or serations 18 formed there around for gripping the handle bar surface, and is for aligning with a like half arcuate slot 21 formed in a flat face 20 of a clamping bracket 19. Like the slot 17, the slot 21 preferably includes a series of spaced apart teeth or serations 22 for gripping the handle bar surface. To provide for mounting the clamping bracket 19 to the body portion flat face 16 is urged against clamping bracket 19 flat face 20 so as to clamp the slots 17 and 21, teeth or serations 18 and 22, respectively, against the surface of handle bar 11 that has been fitted therebetween. Screws 24 are provided for fitting and turning into aligned holes 23 formed in the corners of flange ends 16a and 19a of the rectangular body portion flat face 16 and clamping bracket 19. Which screws 24, it should be understood, could be replaced with bolts with nuts for turning over the bolt ends, not shown, or by like fasteners, within the scope of this disclosure. Turning the screws 24 tightly into the aligned holes 23, as shown in FIG. 2, draws the clamping bracket 19 tightly against the flat face 16 of the rectangular body portion 15, clamping the rectangular body portion 15 onto the handle bar 11 end.

The double clamp 13 is also for coupling to end 14a of the mounting rod 14, with the rectangular body portion 15 formed with a flat face 26 formed across the body portion side that is opposite and parallel to the flat face 16. The flat face 26 includes a half arcuate slot 27 formed thereacross that, like slot 17, includes longitudinal teeth or serations 28 formed there along. Which slot 27 is formed across approximately the center of the slot 17, and is to receive the end 14a of the mounting rod 14 fitted therein. For maintaining the mounting rod end 14a in the slot 27, a clamping plate 29 is provided that includes a half arcuate slot 30 formed across the plate center, between wings 29a on opposite sides thereof the half arcuate slot 30 includes longitudinal teeth or serations 31, that are like teeth or serations 28, and are for engaging and binding against the surface of the mounting rod end 14a. To provide for maintaining the clamping plate 29 onto the flat face 26, screws 32 are arranged for turning in aligned holes 33 that are formed in wings 29a of the clamping plate 29 and in the flat face 26. The screws 32 are turned tightly into aligned holes 33, clamping the clamping plate 29 against the flat face 26, maintaining the mounting rod end 14a there between.

The mounting rod 14, as shown in FIGS. 1 and 2, is preferably a straight rod that is bent at a right angle 14c that is before a mounting rod mid point. The mounting rod 14 is for proving both a vertical and horizontal off-set to a reservoir housing assembly 40 from the handle bar 11 hand grip 12, as shown best in FIG. 2. The vertical off-set allows an operator, not shown, to easily fit his hand below the mounting rod 14 and grasp the hand grip, with the length of the mounting rod from the bend 14c to its end 14b providing for off-setting the reservoir housing assembly 40 away from the operator's body, insuring that a soap bubble flow will not be directed into the operator's face.

The reservoir housing assembly 40, shown in FIGS. 1 through 3, is for fitting onto end 14b of the mounting rod 14 by telescoping a compression coupling 42 there over. The compression coupling 42 is formed in an end 41a of a beam 41 that extends horizontally outwardly from the bottom of a reservoir housing 50. As shown, the compression coupling 42 consists of a half cylindrical sleeve 43 that is mounted along a lower edge of the end 41a of the beam 41 and is to receive a mirror image half cylindrical sleeve 44 to be fitted and maintained there over. The coupled half sleeves 43 and 44 provide a cylindrical passage therethrough of a diameter to accommodate the mounting rod end 14b fitted therein. The half sleeves 43 and 44 individually provide for clamping longitudinal teeth or serations 43a and 44a, respectively, against the surface of the mounting rod end. A non-slip coupling is thereby provided with the reservoir housing assembly 40 prohibited from turning on the mounting rod end 14b.

As shown in FIGS. 1 and 2, for providing coupling of the half sleeves 43 and 44 a pair of aligned mounting piers 45a and 45b are individually maintained to one side of each of the half sleeves 43 and 44, respectively, arranged across their centers. The mounting pier 45a includes a threaded rod 46 extending axially therefrom that is for fitting though a longitudinal hole formed through the mounting pier 45b that receives the threaded rod 46 fitted therethrough, with the threaded rod end receiving a wing nut 47 turned thereon to engage the top surface of the mounting pier 45b. While a single coupling arrangement for joining one side of the half sleeves 43 and 44 together is set out in FIGS. 1 and 2 and described above, it should be understood that a like coupling arrangement can be utilized to join the opposite half sleeve sides. Or, within the scope of this disclosure, another coupling arrangement could be so used, for example, a screw or screws, not shown, that are turned through the one half sleeve and into the other along the half sleeve edges on the half sleeve side opposite to the wing nut 47 and threaded rod 46 coupling.

The respective compression coupling 42 and double clamp 13 each provide components for squeezing against the mounting rod 14 ends 14b and 14a, respectively. Where a thin walled tube of a metal such as aluminum or a plastic material is used for the fabrication of the mounting rod, such couplings could crush the mounting rod ends, compromising the coupling strength. To avoid such crushing, without a necessity to provide a solid mounting rod 14, the invention preferably includes solid end inserts 48 that can be manufactured from metal, a hard plastic, or the like, that are for fitting snugly into the mounting rod 14 ends, and, as shown, are preferably rounded at their ends, as shown in FIGS. 1 and 2.

Shown in FIGS. 1 through 3, the beam 49 is formed as a hollow unit with interior bracing, preferably from a plastic by molding methods, or the like, and provides a strong support with an eye pleasing appearance. As shown, the beam 49 is formed as a straight rectangular section with longitudinal ribs 49a and 49b extending outwardly from the middle of the beam top and bottom faces that extend the length thereof and are shown as continuations of coupled edges of front and rear sections 60 and 61, respectively, of reservoir housing 50. Also, for providing an attractive appearance, the beam is preferably chamfered at 49c across a lower front edge, thereof. Front being the beam 49 and reservoir housing 50 face or surface that faces into a wind stream or flow as is generated by moving the vehicle whereto the bubble toy 10 is mounted.

Figure 4:
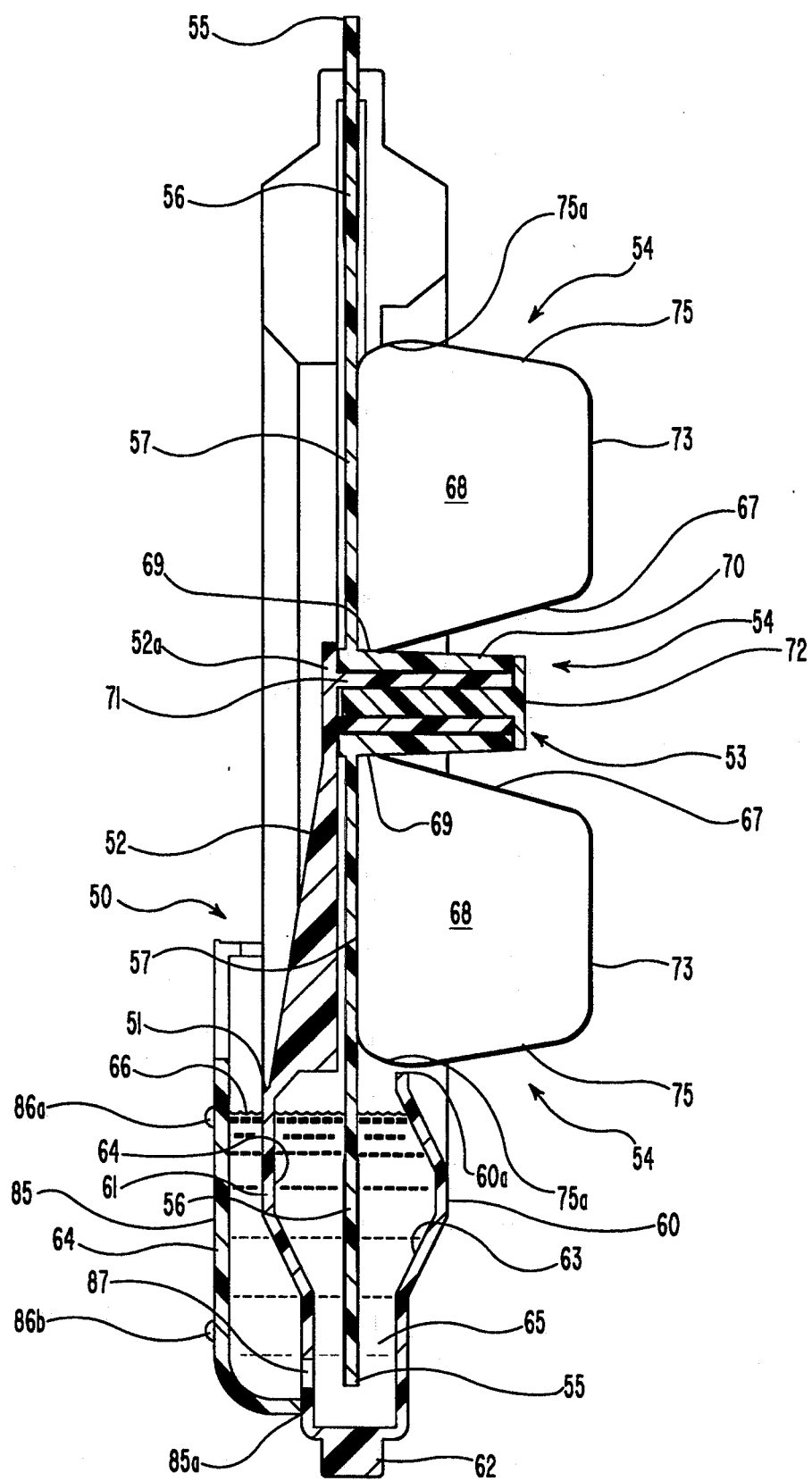
FIG. 4 is a side elevation sectional view taken along the line 4—4 of FIG. 3, showing the reservoir housing as containing a soap and water solution wherethrough propeller or rotor blade ends mounting bubble rings are moved, and showing a transparent panel that includes a sight gauge arranged across a rear section of the reservoir, shown filled with solution, for providing a visual indication of the volume of solution in the reservoir housing.

As shown the reservoir housing 50 includes a solution reservoir 51, that contains a soap and water solution, and includes an upright standard 52, shown best in FIG. 4, that mounts a post 71 of spindle mounting 53 to an end 52a thereof that is for pivotally mounting a propeller or rotor 54 thereto, the propeller or rotor to turn freely on the pin 71. In which turning, bubble rings 55 that are mounted to ends of bars 56 that extend axially from a propeller or rotor mounting edge 57, pass through a bath of soap and water solution maintained in the solution reservoir 51. This passage distributes a soap film across the bubble ring that will generate a flow of bubbles when the bubble ring is moved into an air stream. Turning of the propeller or rotor 54 thereby moves each bubble ring 55, in turn, through the soap and water solution so as to produce a stream of bubbles as the bubble ring enters an air stream that is generated by moving a vehicle whereon the bicycle bubble toy 10 is mounted.

The solution reservoir 51 is formed from front and rear sections 60 and 61 that, as to a solution storage area thereof, are essentially mirror images of one another, and are secured together along common edges, shown as a solid section 62 in FIG. 4. Each solution reservoir front and rear section 60 and 61 includes, respectively, forward and rear concave portions 63 and 64, respectively, that, when the front and rear sections are joined together, project oppositely to form a somewhat donut shaped solution containing area that extends from one solution reservoir 51 end 51a to the other end 51b, as shown in FIG. 1. Shown best in FIG. 4, the bubble rings 55 on the ends of bars 56 each travel, in turn, through the bottom interior area 65 of the solution reservoir, below the concave portions 63 and 64 and above the solid section 62. Wherein is maintained a soap and water solution shown at 66. The bars 56 each join to an edge 57 of a blade 68 of the propeller or rotor 54, and extend therefrom to pass between opposing top edges 60a and 61a of the solution reservoir front and rear sections 60 and 61. Each bar 56 to mount the bubble ring 55 across an end thereof to travel through the solution reservoir bottom interior area 65. Propeller or rotor 54 provides for the travel of the bubble ring 55 by axially turning on spindle 53. To provide which turning, the propeller or rotor includes blades 68, shown herein as four equally spaced blades, that are each connected onto a cylindrical hub at a lower end 69 that is the junction of the blade mounting edges that is the trailing edge 57 when the propeller or rotor is turned and an adjacent blade leading edge 76. Accordingly, each blade 68 extends radially outwardly from the hub at equal intervals there around.

Spindle 53 whereto the propeller or rotor 54 is mounted to spin freely thereon includes the cylindrical post 71 that is open longitudinally and is fixed to extend at a right angle outwardly from a forward face of the standard 52 end 52a. Cylindrical hub 70 is formed to slide over the cylindrical post, providing a journaled mountings, and is maintained thereto by fitting and securing, as by gluing, a broad headed pin 72 into the cylindrical post longitudinal opening. The undersurface of the pin 72 head 15 to engage and block the cylindrical hub 70 end, prohibiting it from sliding off of the cylindrical post 71.

Clearance is provided between the cylindrical post 71 and cylindrical hub 70 to allow for the propeller or rotor 54 to turn freely when an air stream is directed therethrough. The clearance between the cylindrical post 71 and cylindrical hub 70 of the spindle 53 mounting is such that, at a high velocity of air flow as would tend to turn the propeller or rotor 54 at a high rate of turning, the slack between the post and hub tends to allow for some rocking of the propeller or rotor. This rocking tends to create friction that acts to limit the rate of propeller or rotor turning. Additionally, turning of propeller or rotor is also limited by the resistance to passage of the bubble ring 55 and bar end 56 through the solution 66. A limiting of which turning rate allows for a proper soap film coating to adhere to each bubble ring 55 as it passes through the solution reservoir bottom interior area 65, so as to present a uniform soap bubble generation.

As set out above, each propeller or rotor blade 68 mounts the bar 56, along the mounting and trailing edge 57, that is shown bent through a pair of right angles 56a, to provide an off-set of the bubble ring 55 towards a blade forward edge 73 above a blade arcuate section 75a that is at the junction of the blade trailing edge 57 and a blade outer edge 75. The blade forward and outer edges 73 and 75 defining the area swept by the turning propeller or rotor 54. Each blade 68 is preferably flat and is connected at corner 69 to cylindrical hub 70 to angle outwardly from the hub at a blade angle of approximately thirty (30) degrees from a horizontal plane across the hub, as illustrated as angle A in FIG. 1. The blade 68 is thereby angled outwardly from along the mounting edge 57 such that an air stream directed into each blade 68, in turn, strikes that blade surface and acts thereagainst to turn the blade in a clockwise direction, as viewed from the front face of the bubble toy 10. In which turning, the propeller or rotor 54 disk area, which is the area swept by turning the propeller or rotor 54, is forward of the reservoir front section 60 reservoir forward concave portion 63, just clearing the surface of that concave portion as the propeller or rotor is turned. Each blade 68, as set out above, mounts bar 56 that, in turn, has a bubble ring 55 secured onto its end that travels through the soap and water solution 66 in the solution reservoir 51. To provide for unobstructed passage of the bar 56 along the slot between the opposing edges 60a and 61a of the solution reservoir 51 front and rear sections 60 and 61, respectively, the length of the blade trailing edge 57 is such that it will not extend into the slot and the arcuate section 75a formed at the corner of the mounting edge 57 and blade outer edge 75 is selected to miss the solution reservoir surface as the blade 68 is turned. Which blade outer edge 75 preferably is angled at greater than ninety (90) degrees from blade mounting edge 57 to also miss the solution reservoir surface. For presenting a narrow area between the one blade mounting edge 57 and a following blade leading edge 67, that is the blade turning, the blade leading edge 67 is connected to form essentially a right angle to the side of the cylindrical hub 70.

As set out above, blade 68 turning moves each bubble ring 55, in turn, through the soap and water solution 66, to coat the inner area of the ring with the solution. As shown best in FIG. 3, to provide for an improved bubble ring 55 coating, a number of posts 80 are secured at equal intervals to extend inwardly from around the inner circumference of ring 55, each pointing along a radial from the ring center. Each post 80 mounts one or more cross pieces 81 thereto, the cross piece ends to align with one another forming one or more broken subrings. The posts 80 and cross pieces 81 forming the partial subrings provide surface areas for attracting an adhesion of solution 66 thereto. So arranged, an air stream directed through the bubble ring 55 and areas between the subrings produces a multitude of both small and large bubbles therefrom, as illustrated in FIG. 2.

In practice, it has been found that a most effective bubble production is provided by protecting the coated bubble ring 55 from the air stream prior to its full exposure thereto by a utilizative of a shield 82, that is shown as essentially one half of a flat disk, that is arranged across the solution reservoir end 51a. It is from behind that shield 82 that the bubble ring 55 mounted onto a blade 68 is turned into the air stream. The curved outer circumference of the flat shield 82 restricts the air stream passage into a continuously expanding curved area across a bubble ring 53 to discourage bubble production and separation until the ring has fully entered the air stream.

As set out above, the solution reservoir 51 is to contain soap and water solution 66 wherethrough the bubble rings 55 are passed. To provide additional capacity, a reservoir wall 85 is attached to the solution reservoir rear section 61 to extend thereacross, as shown in FIG. 4, from adjacent to the outer edge 62 to above the rear concave portion. The area between the reservoir wall 85 and the surface of the rear section 61 provides an open area for also containing solution 66, which rear section is open at hole 87 into the solution reservoir 51 to allow free passage of the solution 66 into the solution reservoir bottom interior area 65 wherethrough each bubble ring 55 travels. The reservoir wall 85 is preferably formed of a transparent material to allow an operator to see the level of solution 66 therein. For enabling the operator to gauge the amount of solution 66 remaining in the bubble toy 10 a full line 86a, shown in FIG. 4 as a ridge, is formed to extend outwardly from and across the surface of the reservoir wall 85, and an empty line 86b, shown also as a ridge, is also provided, that is spaced apart from and below the full line 86a, for indicating to the operator, when the solution level aligns with the empty line, that the bubble toy solution 66 must be replenished. To replenish or provided that is preferably formed as a spout 88 that extends outward from along the top of the reservoir wall 85, alongside the flat shield 82. Solution 66 is to be poured through the spout 88 and travel into the area between the reservoir wall and the surface of the rear section 61. In which pouring, as required, a baffle plate can to arranged below the spout, not shown, for receiving the solution flow so as to slow it down to preclude its splashing out of the fill spout. As the solution fills the area behind the reservoir wall 85 it is allowed to enter the solution reservoir through the hole 87 and is accordingly restricted, during filling, from passing out of the slot between the front and rear sections 60 and 61. Which slot, as shown best in FIG. 4, is narrow to just accommodate the bar 56 traveling therealong, while still restricting the bubble solution from splashing therefrom as for example when a vehicle mounting the bubble toy 10 is rapidly accelerated or decelerated.

As set out above, subjecting the bubble toy 10 to an air stream, as when a vehicle mounting the toy is moved, turns the propeller or rotor 54 that, in turn, moves the bubble rings 55 through the solution 66, producing a flow of bubbles exiting the device. To turn off, or discontinue the soap bubble production, the invention employs a switch or brake 90 that is shown best in FIGS. 1 and 3. The brake 90 is preferably a U shaped device having opposing parallel legs 91 and 92 with a right angle web 93 formed therebetween. The brake 90 includes pivots 94 that are formed to extend outwardly towards one another, shown in broken lines in FIG. 3, from the opposing surfaces of the legs 91 and 92 and are each to fit into each of a pair of holes formed into the front and rear sections 60 and 61, not shown. A pivot coupling is thereby provided that allows the brake to be moved between the solid and broken line attitudes shown in FIG. 3, in which broken line attitude, the brake blocks turning of the propeller or rotor 54. To facilitate movement of the brake 90 between the attitudes shown in FIG. 3, the leg 92 is preferably formed to be longer than the leg 91 for manipulation by an operator to turn off the bubble flow.

The above sets out a full discussion of a preferred embodiment of the bubble toy 10 of the invention. The components thereof, as set out, are preferably formed for joining together with adhesive and fasteners, such as screws or bolts. Though, it should be understood, other connection arrangements could be so used within the scope of this disclosure. Preferably, the components or elements of the bubble toy are formed individually from a plastic or other suitable material utilizing conventional molding methods and are joined together, as described, to have the configuration and appearance, as shown. Though, it should be understood, the invention could be otherwise formed to have a different appearance, within the scope of this disclosure.

Hereinabove has been set out a preferred embodiment of the bicycle bubble toy of the invention that is shown and described herein for mounting onto a wheeled vehicle whose forward movement generates an air stream therethrough to operate the device for producing a stream of soap bubbles. It should, however, be understood that the present disclosure is made by way of example only and that variations and changes to the preferred embodiment of the invention as shown and described are possible without departing from the subject matter coming within the scope of the following claims, and a reasonable equivalency thereof, which claims we regard as our invention.

We claim:

1. A bicycle bubble toy comprising, a reservoir housing formed from opposing arcuate front and rear sections that are joined together along a common lower edge and are open between upper edges providing an open slot, said reservoir housing further including a straight upright standard that is secured at a lower end to said rear arcuate section, with a point on a forward face of a standard upper end at a center of arc of the joined arcuate sections, and a post is secured to said standard upper end at said center of arc that extends outwardly at approximately a right angle therefrom and is open longitudinally to receive a pin means fitted therein; a propeller means that includes a plurality of blades that extend at equally spaced intervals from around a hub, that is a cylinder that is open therethrough for axial mounting onto said post, and each said blade is canted at a like blade angle from a right angle plane across said hub, and each said blade includes an edge that, when said blade is turned, travels above approximately the longitudinal center of said slot; a pin means that includes a cylindrical body for fitting into said post longitudinal opening and has a broad flat head whose edge extends above a hub end for maintaining said hub onto said post; a bar means is mounted to each said blade edge to extend outwardly therefrom and travel along said slot as said propeller means turns, and each said bar means mounts a bubble ring across an outer end thereof to travel through said reservoir housing interior as said bar means is moved along said slot; and means for mounting said reservoir housing to extend outwardly from a handle bar of a bicycle, tricycle, or the like.

2. A bicycle bubble toy as recited in claim 1, wherein the front and rear sections forming the reservoir housing each having a concave arcuate portion formed thereacross, and said sections are joined along their outer edges such that their said arcuate portions face oppositely, forming an interior cavity.

3. A bicycle bubble toy as recited in claim 2, wherein the reservoir area includes an open area below the concave arcuate portions of the front and rear sections wherethrough the bubble ring travels.

4. A bicycle bubble toy as recited in claim 1, wherein each propeller means blade is flat and has a blade angle of approximately thirty (30) degrees forward of a right angle plane across the hub.

5. A bicycle bubble toy as recited in claim 1, wherein the blade edge that travels above the slot is a trailing edge as the propeller means is turned; and the bar means extends axially from said blade edge and wherein two opposite right angle bends are formed to off-set the bar means end whereto the bubble ring is secured away from said blade edge towards a blade leading edge.

6. A bicycle bubble toy as recited in claim 1, wherein the bubble ring is a circular ring that is mounted at a point along its outer circumference to the bar means end to extend across said bar means end; and a plurality of ring segments are secured at equal intervals to points around said circular ring inner circumference in a plane across said circular ring, that each consist of spaced posts, and each post is connected at a post end to said inner circumference of said circular ring, extending radially therein, and mounts at least one right angle cross piece thereacross, said cross pieces to align end to end as a broken subring.

7. A bicycle bubble toy as recited in claim 1, further including a shield that is formed as approximately one half of a flat disk and is secured across an end of the reservoir housing front section, parallel to the slot wherefrom the bubble ring emerges during propeller means turning.

8. A bicycle bubble toy as recited in claim 1, further including a brake means that consists of a brake bar means that is pivotally connected to the reservoir housing so as to be pivoted across the slot, blocking travel of a bubble ring.

9. A bicycle bubble toy as recited in claim 8, wherein the brake bar means includes a pair of parallel flat sections with a web secured at right angles therebetween, one of which flat sections is longer than the other for engagement by an operator's finger; and aligned pivots that are formed in to extend inwardly from the opposing faces of said flat sections for fitting in holes formed in the reservoir housing front and rear sections, proximate to the slot.

10. A bicycle bubble toy as recited in claim 1, wherein the means for mounting said reservoir housing includes a straight arm section connected to extend from a bottom of said reservoir housing, in the plane of the slot; clamp means mounted to an end of said straight arm section to receive an end of a mounting rod and clamp it therein; a mounting rod having two opposite cylindrical ends, one for fitting into said clamp means and the other for mounting in one clamp arrangement of a double clamp means, which said mounting rod is bent at approximately a right angle; and a double clamp means that includes a pair of independently operated clamp arrangements, the one pivoted ninety (90) degrees to the other, with one of said clamp arrangements pointing vertically for receiving said other mounting rod cylindrical end.

11. A bicycle bubble toy as recited in claim 10, wherein the clamp means and double clamp means each include a body section face or faces wherein is formed a half cylindrical opening, or crossed cylindrical openings for the double clamp means, that receive, respectively, a bracket, or brackets for the double clamp means, that each include a half cylindrical opening formed therein, said body sections and brackets half cylindrical openings for aligning, so as to clamp onto, the respective mounting rod ends and capable of mounting to a bicycle handle bar; and means for maintaining said half cylindrical openings together in clamping engagement.

12. A bicycle bubble toy as recited in claim 11, further including spaced teeth or serations formed longitudinally in the opposing inner surfaces of the half cylindrical openings.

13. A bicycle bubble toy as recited in claim 1, further including a transparent wall connected around its edges to the reservoir housing rear section, and includes a fill spout means connected across a top end of said transparent wall that is open into the area between said transparent wall and said rear section for passing a soap and water solution therethrough and a transfer hole formed through the rear section, proximate to the bottom thereof.

14. A bicycle bubble toy as recited in claim 13, wherein spaced apart full and empty level ridges are formed across the transparent housing.

* * * * *